US 6,568,554 B2

(12) United States Patent
Booth et al.

(10) Patent No.: US 6,568,554 B2
(45) Date of Patent: May 27, 2003

(54) HYDRAULIC OR PNEUMATIC SAFETY DEVICE FOR FLUID HANDLING APPARATUS

(75) Inventors: Walter A. Booth, East Hanover, NJ (US); Leonard Falcone, Lake Hopatcong, NJ (US)

(73) Assignee: H-Tech, Inc., Wilmington, DE (US)

( * ) Notice: Subject to any disclaimer, the term of this patent is extended or adjusted under 35 U.S.C. 154(b) by 10 days.

(21) Appl. No.: 09/908,835

(22) Filed: Jul. 19, 2001

(65) Prior Publication Data

US 2002/0008110 A1 Jan. 24, 2002

Related U.S. Application Data

(60) Provisional application No. 60/220,055, filed on Jul. 21, 2000.

(51) Int. Cl.[7] .............................................. B65D 45/00
(52) U.S. Cl. ...................................... 220/316; 220/263
(58) Field of Search ................................ 220/315, 316, 220/318, 319, 321, 260, 262, 263

(56) References Cited

U.S. PATENT DOCUMENTS 3,458,083 A * 7/1969 Erwin, Jr. .................... 220/316
4,515,287 A * 5/1985 Baudoux et al. ............. 220/316
4,750,635 A * 6/1988 Piegza et al. ................ 220/316
5,317,959 A * 6/1994 Beluzzi ....................... 220/316

* cited by examiner

Primary Examiner—Nathan J. Newhouse
(74) Attorney, Agent, or Firm—Selitto, Behr & Kim (57) ABSTRACT

A pressure vessel in accordance with the present invention comprises a cover, movable between an open position and a closed position, and a clamp for releasably clamping the cover in its closed position. The clamp includes a handle for manually operating the clamp. The handle is movable between a first position, in which the clamp releasably holds the cover in its closed position, and a second position, in which the cover is free to be moved to its open position. The pressure vessel further comprises locking means, including a latch pin for releasably locking the handle in its first position upon actuation of the latch pin, and actuating means, including a flexible diaphragm which is responsive to an increase in pressure within the pressure vessel, for actuating the latch pin when the pressure within the vessel has reached a predetermined level.

12 Claims, 10 Drawing Sheets

HYDRAULIC OR PNEUMATIC SAFETY DEVICE FOR FLUID HANDLING APPARATUS

CROSS REFERENCE TO RELATED APPLICATION

This is a § 111(a) application relating to provisional U.S. Application Ser. No. 60/220,055, filed Jul. 21, 2000.

FIELD OF THE INVENTION

The present invention relates to safety devices for fluid handling apparatus. More particularly, the safety device of the present invention is intended for use with fluid handling apparatus that operate under high pressure to prevent the intentional or unintentional opening of such fluid handling apparatus when the pressure accumulated therein exceeds a predetermined level.

BACKGROUND OF THE INVENTION

Fluid handling apparatus, generally, are well known and are used in various industries, such as pharmaceutical or other chemical manufacturing, to perform component operations, such as filtration and straining, within larger processes. Fluid handling apparatus may also, however, be used in a process that consists primarily of a filtration or straining operation. From time to time, fluid handling apparatus must be opened for cleaning, declogging or other maintenance or repair. It is often the case that the pressure inside the fluid handling apparatus builds up during operation to unsafe levels. On such occasions, unless the pressure is first released through valves typically provided for this purpose, the operator opening the fluid handling apparatus, or anyone in the vicinity thereof, is at risk of physical injury. Under these conditions, as soon as the cover/clamp of the fluid handling apparatus is disengaged, the internal pressure within the fluid handling apparatus can cause the cover to be flung open with enough force to physically injure the operator or any bystander in the vicinity of the apparatus. In the past, the internal pressure has actually been high enough to cause the cover to be ejected from the fluid handling apparatus, thereby increasing the safety hazard to the operator and bystanders.

SUMMARY OF THE INVENTION

The present invention overcomes the disadvantages and shortcomings of the prior art discussed above by providing a fluid handling apparatus with a safety device designed to keep the cover of the fluid handling apparatus secured in its closed position, such that it cannot be either intentionally or unintentionally opened, for so long as the fluid pressure inside the fluid handling apparatus exceeds a predetermined safe level. The fluid handling apparatus typically includes a securing mechanism with a handle that, when in its engaged position, securely holds the apparatus cover in its closed position. The safety device is designed to lock or latch the handle into its engaged position when the fluid pressure inside exceeds the predetermined safe level.

More particularly, a pressure vessel in accordance with the present invention comprises a cover that is movable between an open position and a closed position and a clamp for releasably clamping the cover in its closed position. The clamp includes a handle for manually operating the clamp. The handle is movable between a first position, in which the clamp releasably holds the cover in its closed position, and a second position, in which the cover is free to be moved to its open position. The pressure vessel further comprises locking means, including a latch pin for releasably locking the handle in its first position upon actuation of the latch pin, and actuating means, which is responsive to an increase in pressure within the pressure vessel, for actuating the latch pin when the pressure within the vessel has reached a predetermined level.

Other features and aspects of the present invention will become more fully apparent from the following detailed description of the exemplary embodiments, the appended claims and the accompanying drawings.

BRIEF DESCRIPTION OF THE DRAWINGS

For a better understanding of the present invention, reference is made to the following detailed description of an exemplary embodiment, considered in conjunction with the accompanying drawings, in which.

DETAILED DESCRIPTION OF THE INVENTION

A clear description of the purpose and operation of the safety device of the present invention requires a brief description of the general structure and operation of a typical fluid handling apparatus with which the safety device is intended to be used. Furthermore, while the safety device can be used with many different kinds of fluid handling apparatus, it is especially suitable for use with fluid handling apparatus that are designed for system operating pressures up to 300 pounds per square inch ("psi") and also especially for use with a liquid filtration or straining apparatus of such design. Accordingly, the following description is of a generic liquid filtration apparatus, the structure and operation of which is generally well known and it being understood that the safety device may also be used with a liquid straining apparatus, as well as with air or gas handling apparatus.

Figure 1:
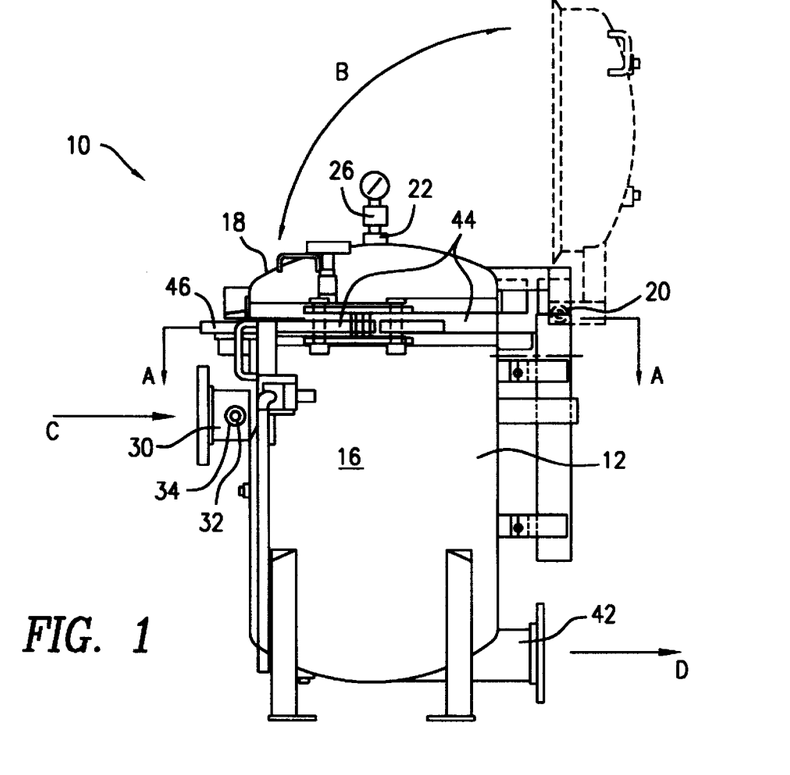
FIG. 1 is a side elevational view of a liquid filtration apparatus adapted for use with a safety device constructed in accordance with the present invention.
Figure 2:
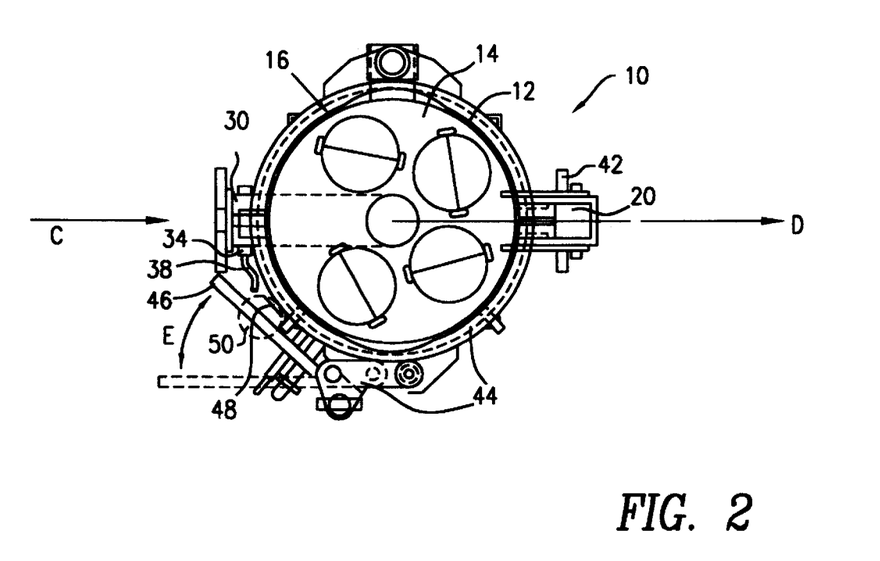
FIG. 2 is a cross-sectional view, taken along section line A—A of FIG. 1 and looking in the direction of the arrows, of the liquid filtration apparatus shown in FIG. 1.
Figure 3:
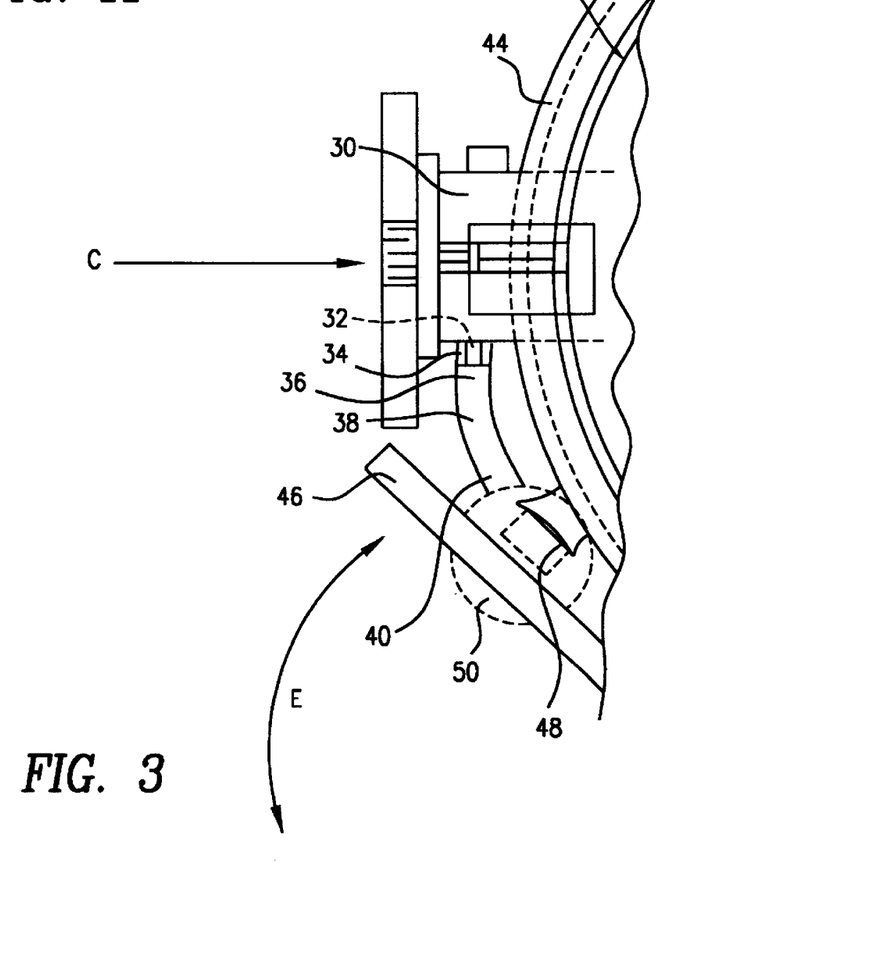
FIG. 3 is an enlarged view showing a portion of the liquid filtration apparatus and an associated safety device, whose location is shown schematically for reasons of clarity.

With reference now to FIGS. 1 through 3, in general, and FIG. 1, in particular, a typical liquid filtration apparatus 10 includes a vessel body 12 having an interior space 14, wherein liquid undergoes filtration, and an exterior surface 16. The liquid filtration apparatus 10 also includes a hatch, such as the vessel cover 18 shown in FIG. 1, that is pivotably connected to the vessel body 12 with a hinge 20 or similar mechanism. With particular reference still to FIG. 1, the vessel cover 18 is moveable in the direction shown by arrow B, between a closed position (shown in solid lines) and an open position (shown in dotted lines). The vessel cover 18 is provided with a vent connection 22 having a pressure-relief valve 26 for a purpose to be described hereinafter. It should be noted that it is not uncommon for the hatch to be flat or to be connected on the side of the vessel body 12, or both, rather than the lid-like, dish-shaped vessel cover 18 described herein.

The vessel body 12 further includes an inlet 30 which allows unfiltered liquid to enter the interior space 14 from the direction shown by arrow C in FIGS. 1–3. As shown in FIG. 3, the inlet 30 is provided with a side opening 32 having a connector fitting 34. One end 36 of a conduit 38 is connected to the side opening 32 at the connector 34 and the other end 40 of the conduit 38 is connected to a safety device (not shown) in a manner and for a purpose which will both be described hereinafter. The conduit 38 can be made of metal pipe, flexible tubing or any material capable of conducting fluid from the liquid filtration apparatus 10 to the safety device.

The vessel body 12 also includes an outlet 42 located on a side opposite the inlet 30. The outlet 42 provides a means of egress for filtered liquid to exit from the interior space 14 of the vessel body 12 in the direction shown by arrow D in FIGS. 1 and 2. It should be noted that the conduit 38 may be connected to a side opening in the outlet 42, or at both the inlet 30 and the outlet 42, rather than only at the inlet 30 as discussed above.

The liquid filtration apparatus 10 further includes a restraining mechanism, such as the toggle clamp 44 shown in FIGS. 1–3, for sealably securing the vessel cover 18 in its closed position (see solid lines in FIG. 1) during operation of the liquid filtration apparatus 10. The toggle clamp 44 has a clamp handle 46 that engages and disengages the toggle clamp 44. The clamp handle 46 can be pivotably moved, as shown by arrow E in FIGS. 2 and 3, between an engaged position (shown in solid lines), in which the toggle clamp 44 holds the vessel cover 18 sealably and securely onto the vessel body 12, and a disengaged position (shown in dotted lines), in which the toggle clamp 44 releases the vessel cover 18. A mounting bracket 48 is affixed to the exterior surface 16 of the vessel body 12 proximate to the clamp handle 46 to provide a location 50 for attaching the safety device (not shown) to the vessel body 12 as will be described hereinafter.

The structure of an exemplary embodiment of a safety device constructed in accordance with the present invention will now be described. It should be understood that the use herein of relative spatial terms such as, upper, lower, downwardly, top and bottom, are used to simplify the following description and are not intended to limit the orientation in which the safety device can be designed or used. For instance, the safety device can be mounted and operated sideways or inverted, relative to the orientation that is described herein in connection with the preferred embodiment.

Referring to FIGS. 4–7, the safety device 54 includes a body 56, having a lower body flange 58, and a separate bottom cover flange 60 (see FIGS. 5–7) having an inlet opening 62 and a threaded connector 64. The lower body flange 58 and the bottom cover flange 60 are sized and shaped to cooperate with one another to form a diaphragm chamber 66 therebetween with which the inlet opening 62 communicates. The end 40 of the conduit 38 of the liquid filtration apparatus 10 is connected to the inlet opening 62, using the threaded connector 64, and delivers a portion of the liquid in the liquid filtration apparatus 10 into the diaphragm chamber 66 for a purpose to be described hereinafter.

The safety device 54 also includes a flexible diaphragm 68 that is sized and shaped to fit within the diaphragm chamber 66 and align with the lower body flange 58 and the bottom cover flange 60. The diaphragm 68 is made of elastomeric material, such as silicone or TEFLON™, and has a first side 70 that faces the lower body flange 58 and an opposite second side 72 that faces the bottom cover flange 60 and the inlet opening 62. An annular groove 74 is provided on the lower body flange 58 and aligns with a corresponding annular groove 76 provided on the bottom cover flange 60. A securing mechanism, such as the V-band clamp 78 shown most clearly in FIGS. 4–6, holds the lower body flange 58 and bottom cover flange 60 together, with the diaphragm 68 securely held therebetween. It should be noted that the securing mechanism does not have to be a V-band clamp, but rather, it may be any conventional type of device, such other types of clamps or even bolts, that will hold the lower body flange 58, diaphragm 68 and bottom cover flange 60 together securely in air-tight fashion. The diaphragm 68 deforms slightly into the grooves 74, 76 of the lower body and bottom cover flanges 58, 60, respectively, and is thereby prevented from slipping or sliding out from between the flanges. The diaphragm 68 is moveable between a deactivated position (see FIG. 9) and an activated position (see FIG. 10) for purposes to be discussed hereinafter.

The body 56 of the safety device 54 further includes an upper body 80, having a lower chamber 82 and an upper chamber 84, and a latch pin guide tube 86 that connects the lower body flange 58 to the upper body 80. The latch pin guide tube 86 has a through bore 88 with one opening 90 (see FIG. 6) in communication with the diaphragm chamber 66 and another opening 92 (see FIGS. 4 and 5) in communication with the lower chamber 82 of the upper body 80. The upper body 80 is also provided with a pair of mounting ears 94, 96 having holes 98, 100, respectively, each of which is sized and shaped to receive a bolt for attaching the body 56 of the safety device 54 to the vessel body 12 of the liquid filtration apparatus 10 at the location 50 using the mounting bracket 48. It should be noted that any conventional means for securely mounting the body 56 of the safety device 54 to the vessel body 12, such as clamping, welding or clipping, would be acceptable and, therefore, the mounting ears 94, 96 may be substituted or eliminated without affecting the utility or function of the present invention.

Figure 9:
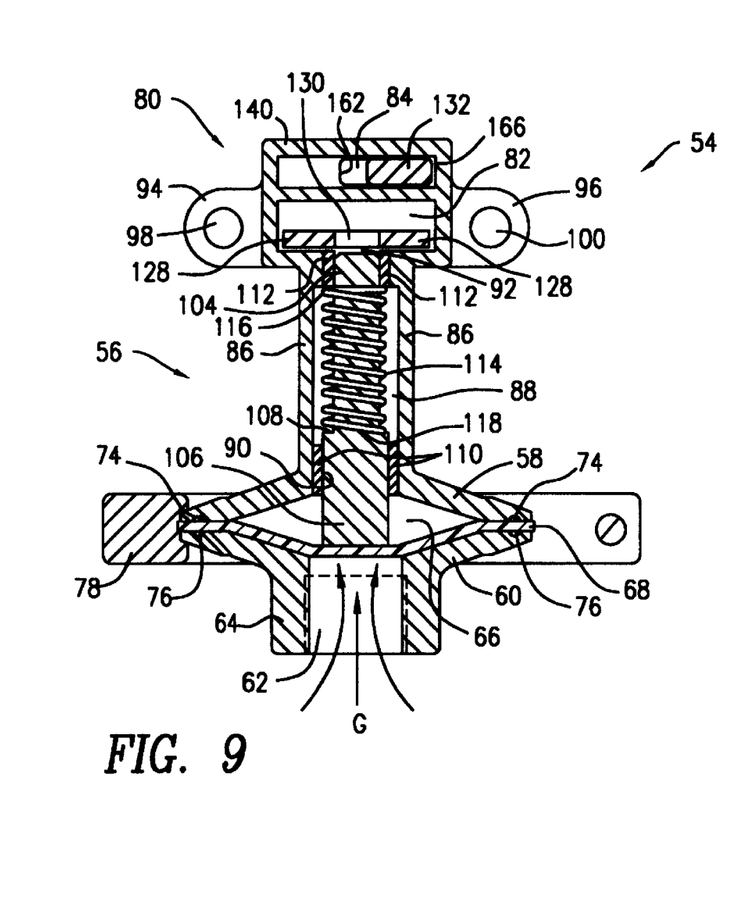
FIG. 9 is a cross-sectional view, taken along section line F—F of FIG. 8 and looking in the direction of the arrows, of the safety device in its deactivated position.
Figure 10:
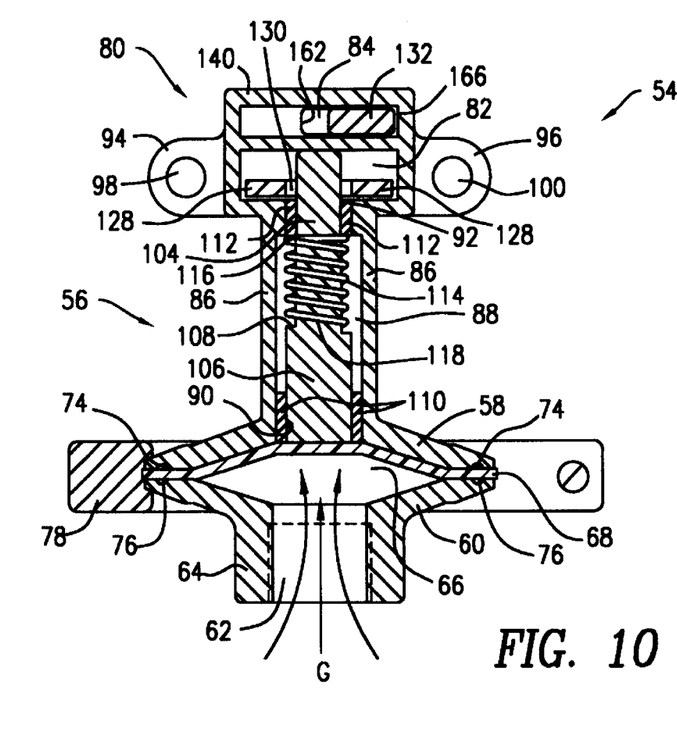
FIG. 10 is a cross-sectional view similar to that of FIG. 9, except that the safety device is shown in its activated position.

The safety device 54 further includes a latch pin 102 that is slideably mounted for reciprocating movement between a retracted position (see FIG. 9) and an extended position (see FIG. 10). The latch pin 102 has a small diameter portion 104, a large diameter portion 106 and an annular shoulder 108 therebetween. A large diameter bushing 110 is positioned securely within the bore 88 at the opening 90 and is sized and shaped to slideably receive the large diameter portion 106 of the latch pin 102. A small diameter bushing 112 is positioned securely within the bore 88 at the other opening 92 thereof and slideably receives the small diameter portion 104 of the latch pin 102. A coil spring 114 is housed within the bore 88. More particularly, one end 116 of the coil spring 114 abuts the small diameter bushing 112 and the other end 118 abuts the annular shoulder 108 of the latch pin 102, with the small diameter portion 104 of the latch pin 102 passing therethrough. It is possible to eliminate the bushings 110, 112 altogether from the safety device 54, thereby reducing the number of components necessary to assemble the safety device 54. Also, it is not required that the latch pin 102 have a small diameter portion 104, a large diameter portion 106, an annular shoulder 108, or any of the foregoing, as long as it can reciprocate between an extended position and a retracted position, for reasons which will be made clear hereinafter. Furthermore, alternative constructions of the body 56 are possible where, for example, the latch pin guide tube 86 includes a window or opening through which the latch pin 102 and coil spring 114 are visible.

Referring specifically to FIG. 9, the coil spring 114 urges the latch pin 102 toward its retracted position, in which it projects downwardly from the opening 90 and into the diaphragm chamber 66. More particularly, as can be seen in FIG. 9, when the latch pin 102 is in its retracted position, its large diameter portion 106 extends into the diaphragm chamber 66 and pushes against the first side 70 of the diaphragm 68, thereby moving the diaphragm 68 into its deactivated position. When in its deactivated position, the diaphragm 68 assumes a concave shape relative to the large diameter portion 106 of the latch pin 102 such that its second side 72 conforms to the inner surface of the bottom cover flange 60.

Figure 11:
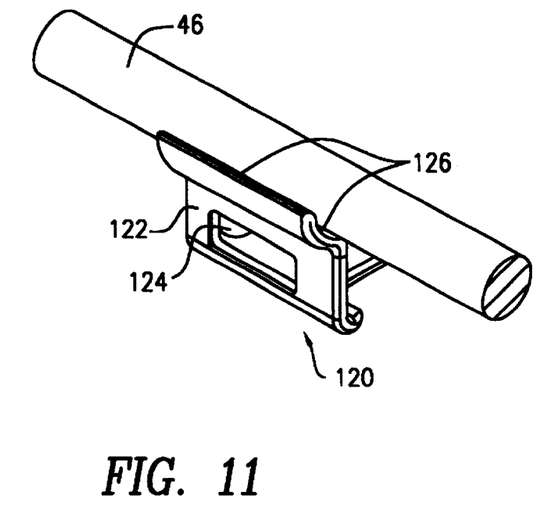
FIG. 11 is a perspective view showing the interconnection between the safety device of FIGS. 4–10 and the liquid filtration apparatus of FIGS. 1 and 2.
Figure 12:
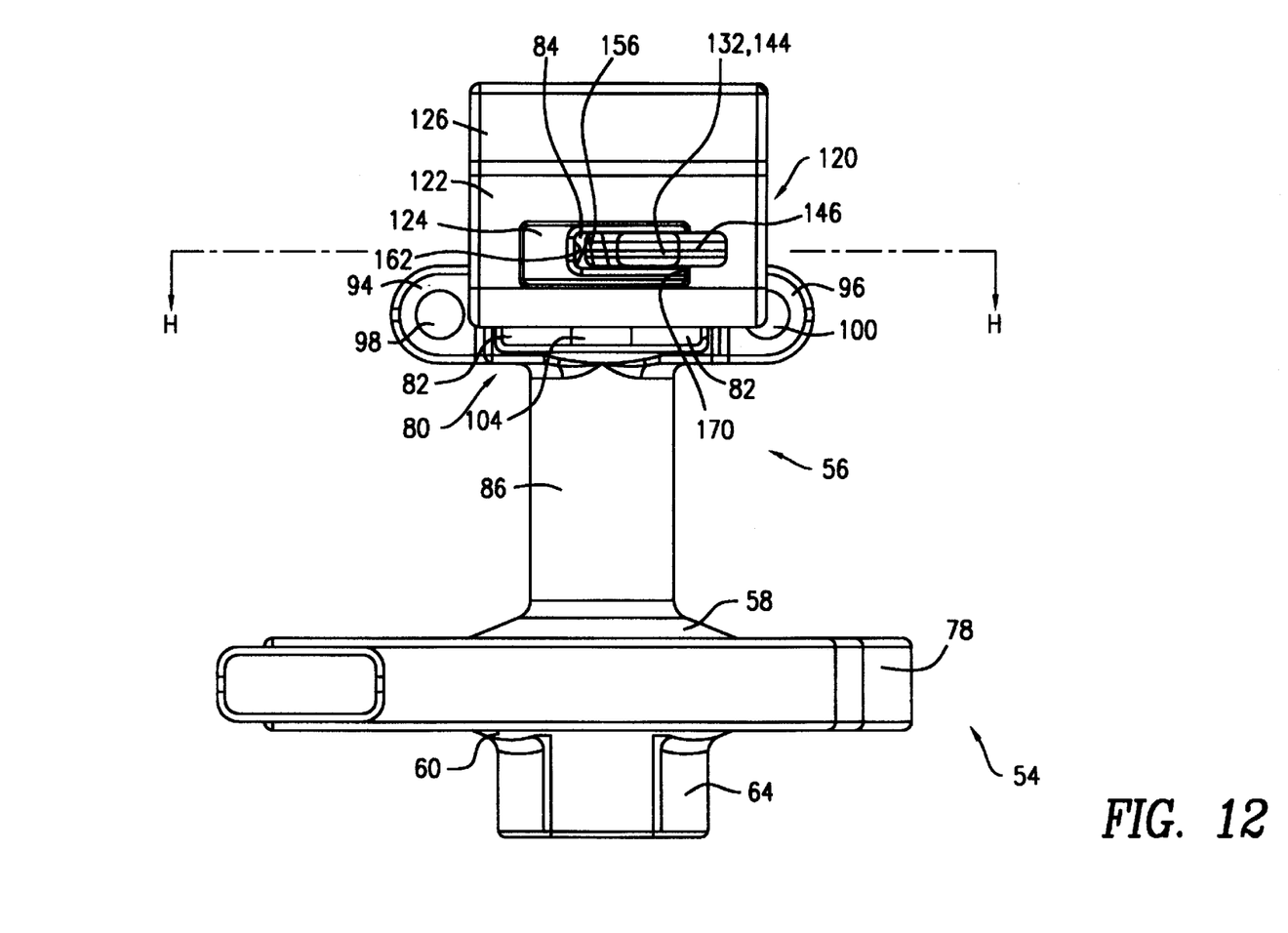
FIG. 12 is a front elevational view of the safety device shown in an assembled state.

With reference particularly to FIGS. 4–5 and 11–12, the safety device 54 further includes an L-shaped latch plate 120 having a first leg 122 with a rectangular hole 124 and an upper arcuate portion 126. The upper arcuate portion 126 is sized and shaped to conform to the outer surface of the clamp handle 46 of the toggle clamp 44 of the liquid filtration apparatus 10. As can be seen in FIG. 11, the latch plate 120 is securely affixed to the clamp handle 46, by conventional means such as welding, bolting or soldering, such that the arcuate portion 126 contacts the clamp handle 46.

Figure 4:
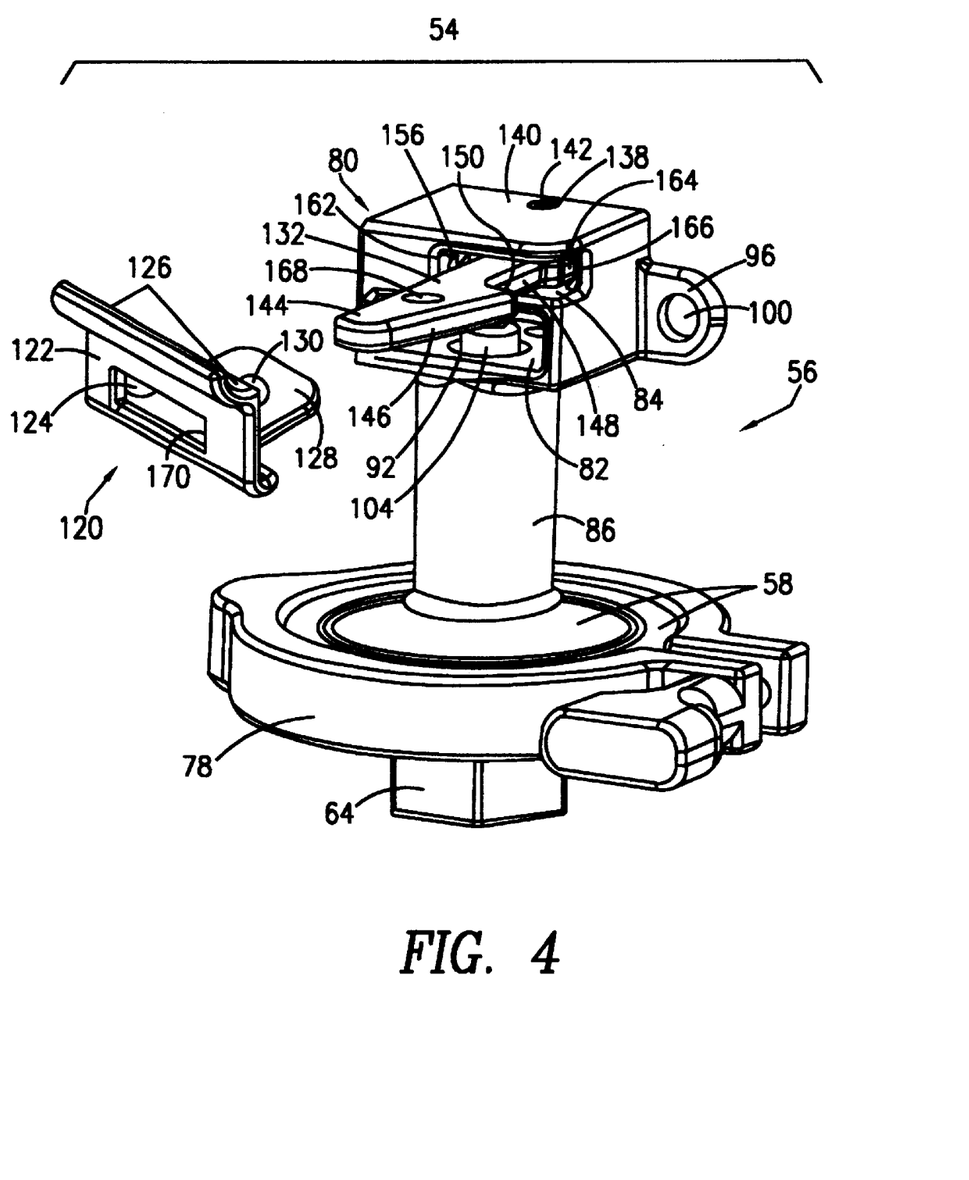
FIG. 4 is a partially exploded perspective view of one exemplary embodiment of a safety device constructed in accordance with the present invention.
Figure 5:
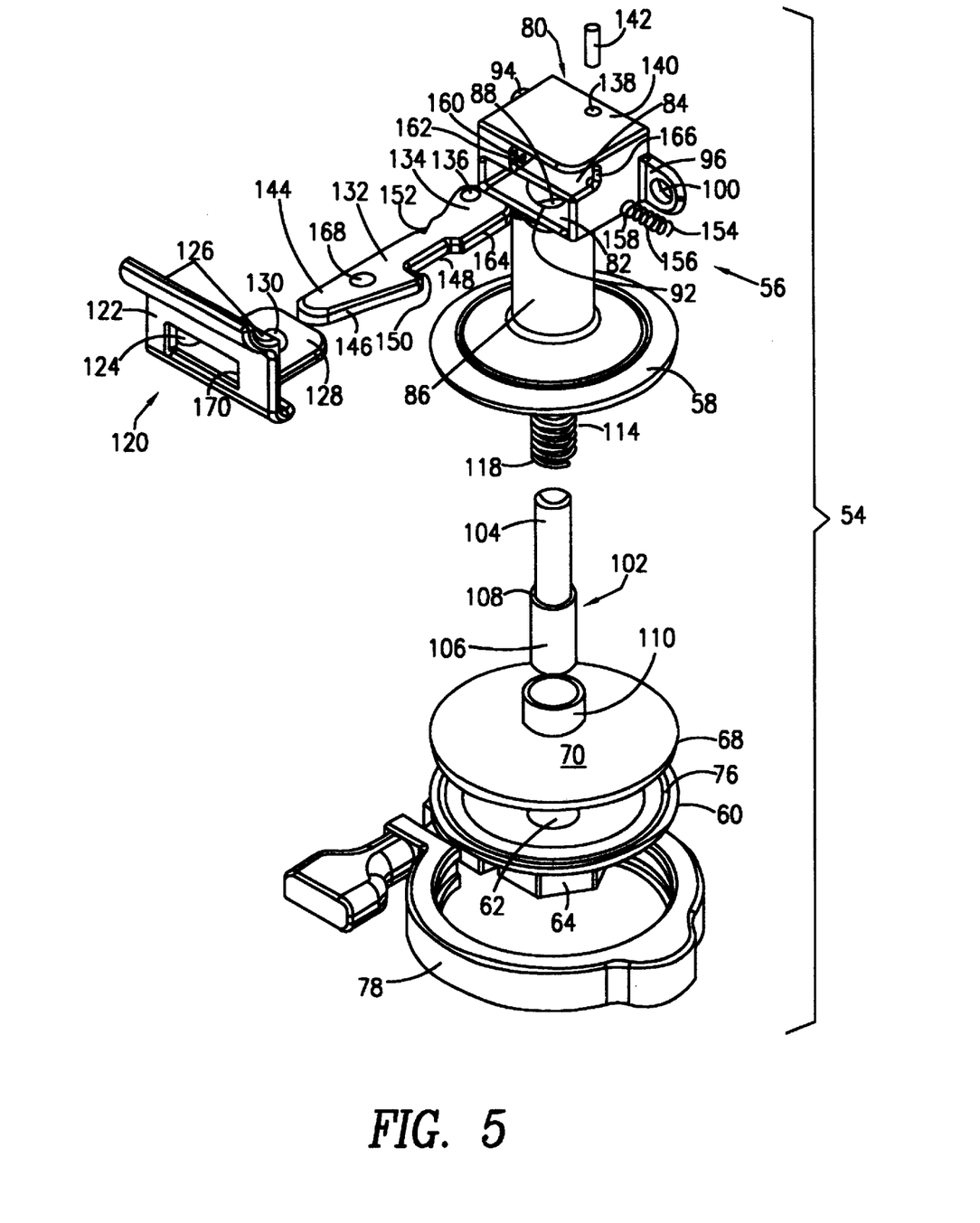
FIG. 5 is a fully exploded perspective view of the safety device shown in FIG. 4.
Figure 6:
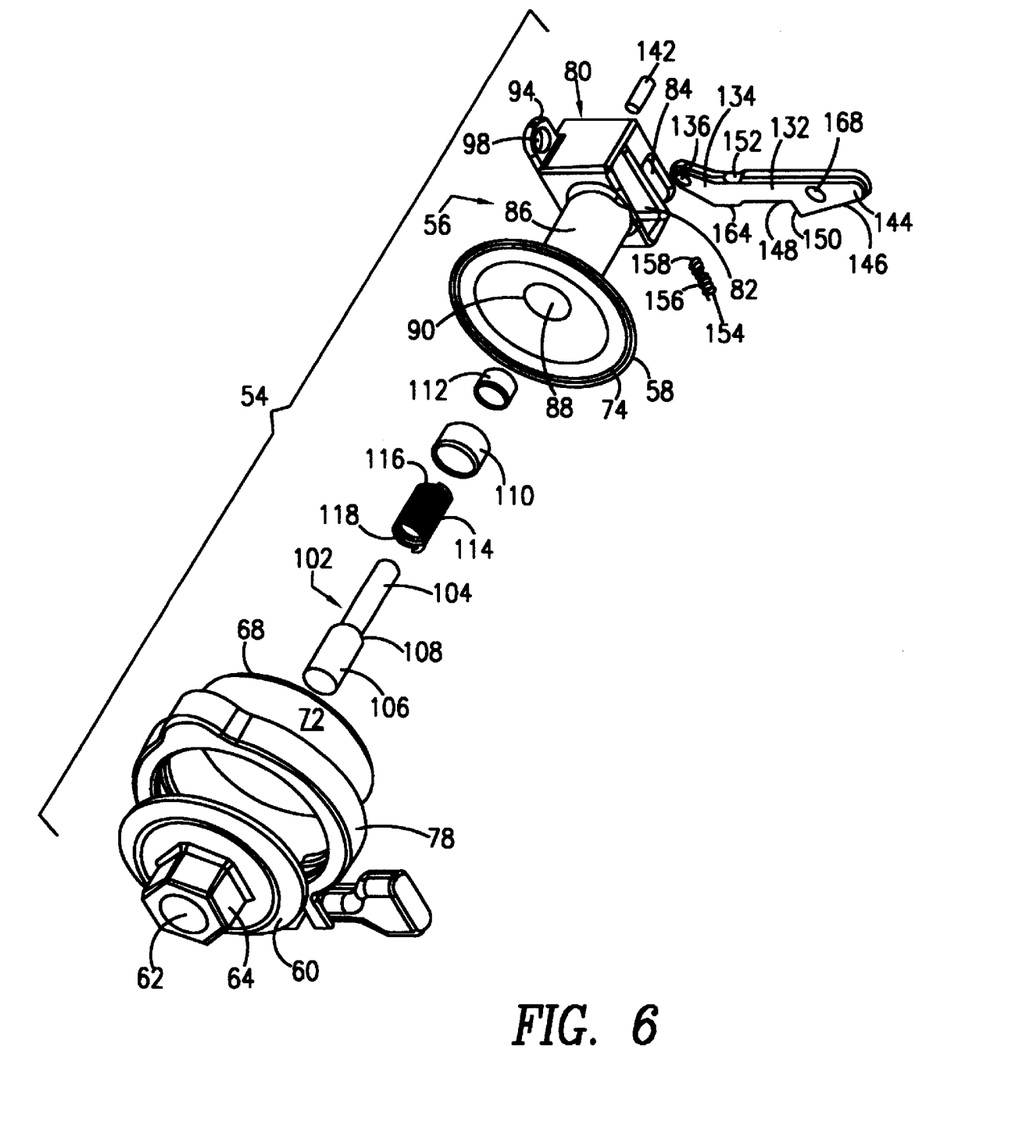
FIG. 6 is another fully exploded perspective view of the safety device shown in FIG. 4.
Figure 7:
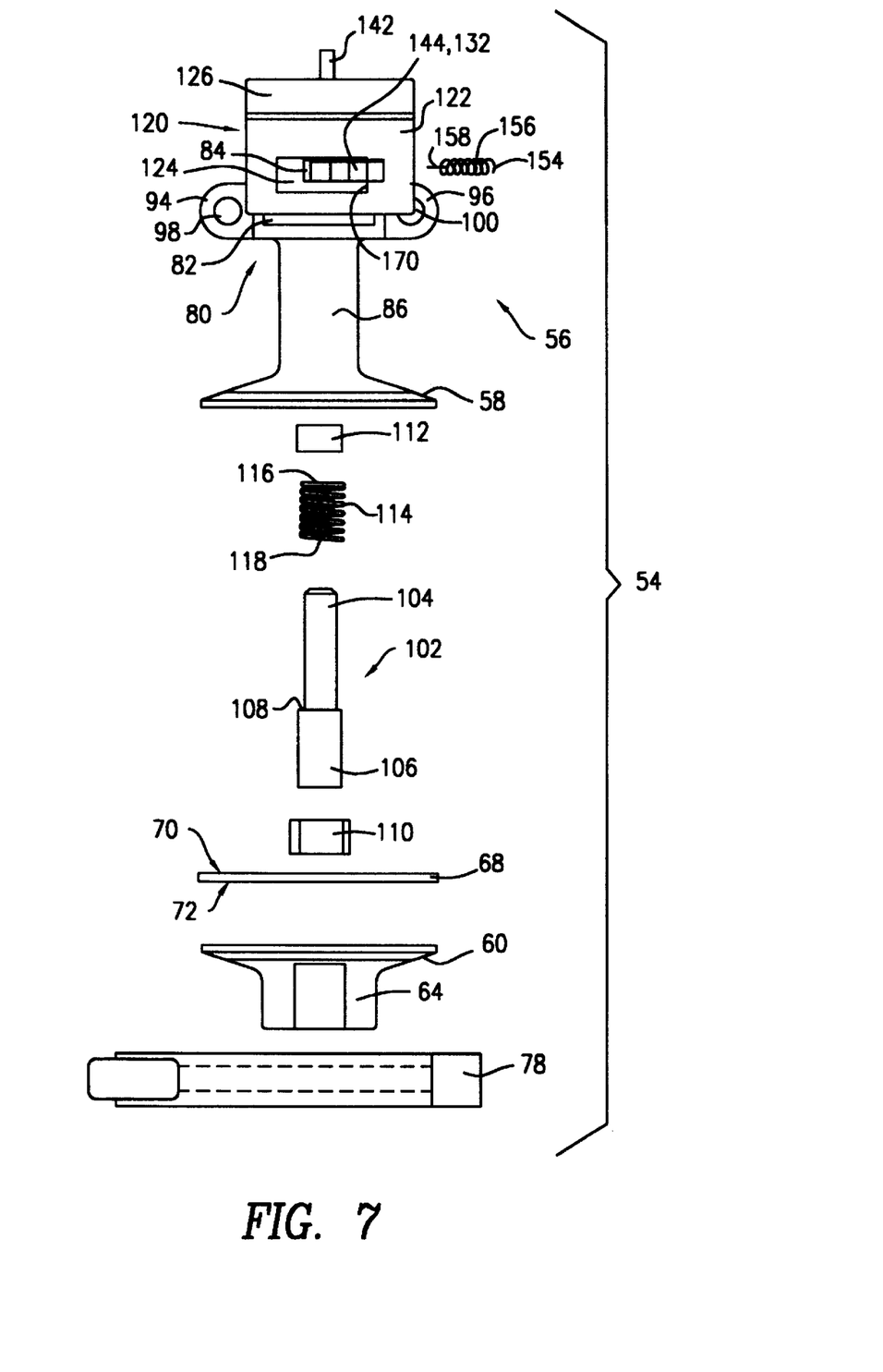
FIG. 7 is a fully exploded elevational view of the safety device shown in FIG. 4.

With continued reference to FIGS. 4–5 only, the latch plate 120 also has a second leg 128 that is sized and shaped to be removeably received within the lower chamber 82 of the upper body 80. In addition, the second leg 128 has a latch pin hole 130 that is sized and shaped to receive the small diameter portion 104 of the latch pin 102. When the second leg 128 is fully received within the lower chamber 82, the latch pin hole 130 aligns with the small diameter bushing 112 positioned at the opening 92 of the bore 88.

Figure 8:
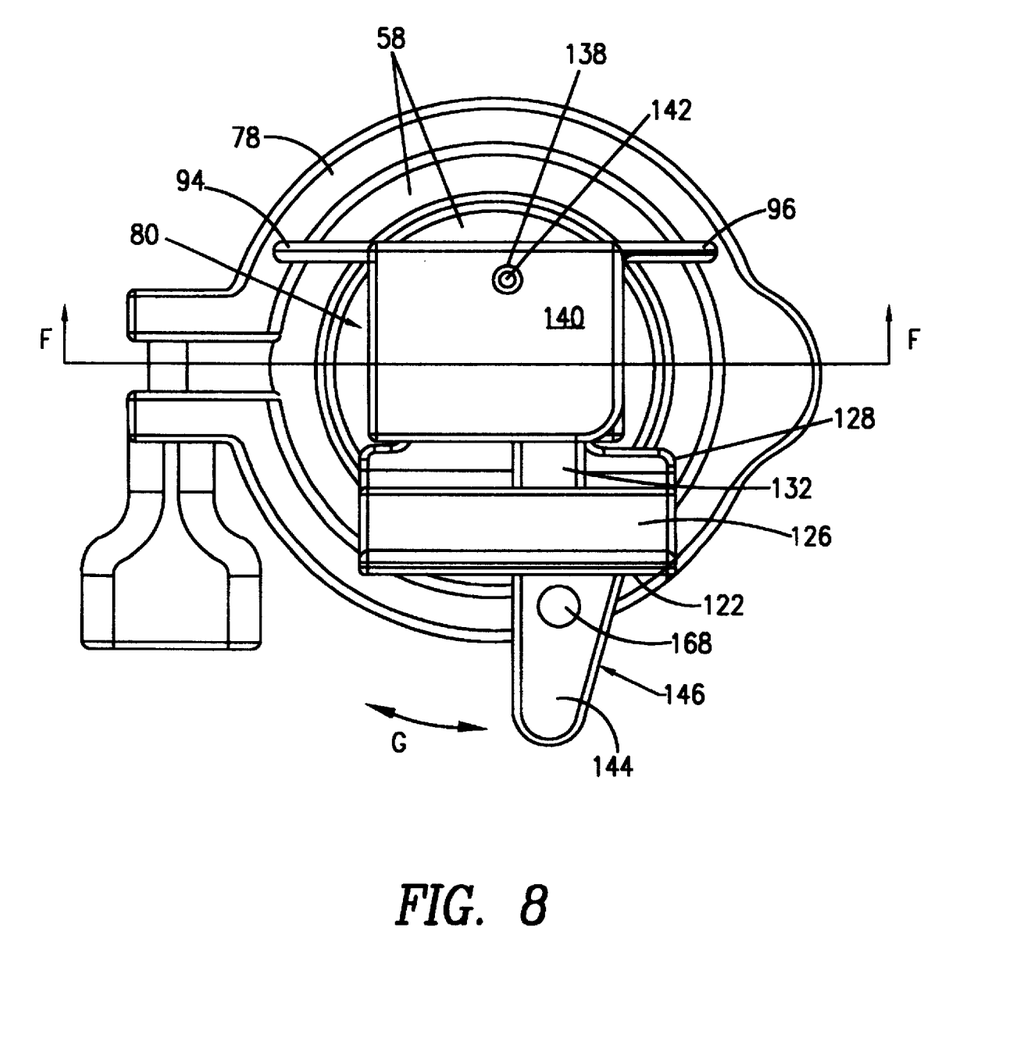
FIG. 8 is top plan view of the safety device shown in an assembled state.
Figure 13:
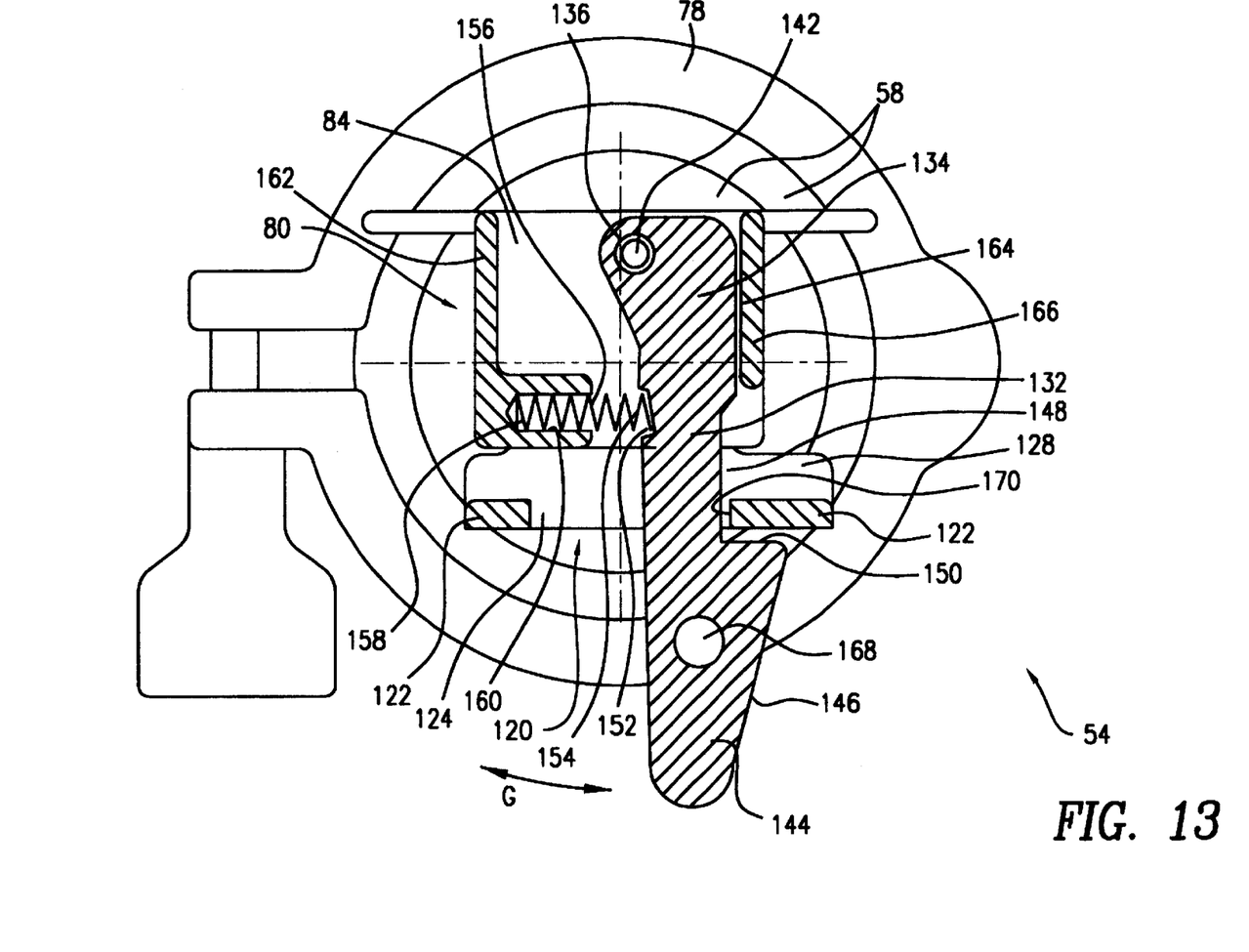
FIG. 13 is a cross-sectional view, taken along section line H—H of FIG. 12 and looking in the direction of the arrows, of the safety device.

With reference now to FIGS. 4–8 and 13, the safety device 54 also includes a latch lever 132 that moves, as shown by arrow G in FIGS. 8 and 13, between a rest or home position (see FIGS. 8 and 13) and a deflected position (not shown). The latch lever 132 has an end portion 134 that is sized and shaped to be received within the upper chamber 84 of the upper body 80 and has a pivot pin hole 136. There is also a pivot pin hole 138 in the top wall 140 of the upper chamber 84 that aligns with the pivot pin hole 136 in the end portion 134 of the latch lever 132 when the end portion 134 is fully inserted into the upper chamber 84. A pivot pin 142 is inserted through the aligned pivot pin holes 136, 138 thereby pivotably attaching the latch lever 132 to the safety device 54.

The latch lever 132 also has a tapered portion 144 that extends outwardly from the upper chamber 84 and is sized and shaped to be received through the rectangular hole 124 of the first leg 122 of the latch plate 120. The tapered portion 144 has a camming side 146 that terminates at a notch 148 which forms a latching shoulder 150 on one side of the latch lever 132. A spring guide notch 152 is provided on the opposite side of the latch lever 132 proximate to the end portion 134. One end 154 of a second coil spring 156 rests in the spring guide notch 152 and the other end 158 of the coil spring 156 is received within a recess 160 provided in a side wall 162 of the upper chamber 84 (see, particularly, FIGS. 5 and 13). The coil spring 156 urges the latch lever 132 towards its rest or home position (see FIGS. 8 and 13), in which a side portion 164 of the latch lever 132 abuts an opposite side wall 166 of the upper chamber 84. The tapered end 144 of the latch lever 132 also has a lock-out hole 168 that is sized and shaped to receive a conventional pad lock for a purpose to be discussed hereinafter.

Prior to, and during, operation of the liquid filtration apparatus 10, the vessel cover 18 must be secured in its closed position (see solid lines in FIG. 1) on the vessel body 12. Thus, prior to commencing filtration, the clamp handle 46 is manually moved into its engaged position, thereby engaging the toggle clamp 44 to securely hold the vessel cover 18 in its closed position. With the vessel cover 18 thus held closed, filtration of the liquid proceeds in the interior space 14 of the vessel body 12. The liquid to be filtered enters the interior space 14 of the vessel body 12 through the inlet 30, from the direction shown by arrow C in FIGS. 1–3. After being filtered, the liquid exits from the interior space 14 through the outlet 42, in the direction shown by arrow D in FIGS. 1 and 2.

During filtration, there is typically a pocket of air trapped in the interior space 14 of the vessel body 12 between the surface of the liquid undergoing filtration and the underside of the vessel cover 18. It is normal that as the pressure increases in the interior space 14, the pocket of air becomes increasingly compressed. When the toggle clamp 44 is disengaged, if the fluid pressure in the interior space 14 has not been reduced to a safe level, the compressed air will instantaneously expand within the interior space 14 and force the vessel cover 18 out of its closed position quickly, forcefully and uncontrollably. This can potentially result in physical injury to the person who disengages the toggle clamp 44.

To reduce the risk of such injury, when the fluid pressure inside the vessel body 12 reaches unsafe levels, prior to disengaging the toggle clamp 44, the fluid pressure must be reduced by opening the pressure-relief valve 26 of the vent connection 22 on the vessel cover 18, which will allow the compressed air and some of the pressurized fluid to escape therethrough. Until enough pressurized air and fluid escapes through the pressure relief valve 26 to reduce the fluid pressure to a safe level, disengagement of the toggle clamp 44, either intentional or unintentional, must be prevented. This can be achieved if the clamp handle 46 is locked in its engaged position for so long as the fluid pressure inside the liquid filtration apparatus 10 remains above a predetermined safe level. The safety device 54 of the present invention is capable of preventing both intentional and unintentional movement of the clamp handle 46 out of its engaged position as will be described hereinafter.

The latch plate 120 of the safety device 54 is securely affixed to the clamp handle 46 so that the second leg 128 extends toward the upper body 80 of the safety device 54 which is mounted at the location 50 on the exterior surface 16 of the vessel body 12 of the liquid filtration apparatus 10. As the clamp handle 46, with the latch plate 120 affixed thereto, is moved into its engaged position, the latch plate 120 approaches the upper body 80 of the safety device 54 and the rectangular hole 124 of the first leg 122 receives the tapered portion 144 of the latch lever 132. The camming side 146 of the tapered portion 144 rides along a side edge 170 of the rectangular hole 124, thereby deflecting the latch lever 132 away from its rest position until the latching shoulder 150 reaches the side edge 170. When the latching shoulder 150 reaches the side edge 170, the latch lever 132 snaps back into its rest position (due to the force exerted by the coil spring 156), the side portion 164 of the latch lever 132 meets the opposite side wall 166 of the upper chamber 84 and the latching shoulder 150 grips the side edge 170 of the rectangular hole 124 (see, e.g., FIGS. 8 and 12). Simultaneously with the foregoing chain of events, the second leg 128 of the latch plate 120 is inserted into the lower chamber 82 of the upper body 80 of the safety device 54 and the latch pin hole 130 aligns with the small diameter bushing 112 and opening 92 of the bore 88 of the latch pin guide tube 86.

The foregoing arrangement prevents unintentional movement of the clamp handle 46 and affixed latch plate 120 away from the safety device 54 and, thus, locks the clamp handle 46 in its engaged position. The latch lever 132 can be manually deflected from its rest position, and the latch plate 120 and clamp handle 46 thereby released, by exerting pressure on the camming side 146 thereof which will deflect the latch lever 132 away from the opposite side wall 166 of the upper chamber 84 and release the grip of the latching shoulder 150 on the side edge 170 of the rectangular hole 124. The clamp handle 46 can then be moved away from the safety device 54 and vessel body 12 to its disengaged position (shown in dotted lines in FIG. 2).

With reference to FIGS. 9 and 10, once the filtration process begins and liquid is entering the vessel body 12 through the inlet 30, pressurized fluid will be diverted through the conduit 38 and the inlet opening 62 of the lower cover flange 60 of the safety device 54 into the diaphragm chamber 66 as shown by arrows G. The pressurized fluid that enters the inlet opening 62 and diaphragm chamber 66 will be a small stream of the inlet liquid that is to be filtered, or sometimes air from the aforementioned and ever-present air pocket. At times, both liquid and air will enter the diaphragm chamber 66 through the conduit 38 and the inlet opening 62. When the pressurized fluid enters the diaphragm chamber 66, it exerts a force, in the direction shown by arrows G, against the second side 72 of the diaphragm 68. As long as the pressure inside the in the interior space 14 of the vessel body 12 remains at a safe level, the force exerted by the pressurized fluid on the second side 72 of the diaphragm 68 will not be sufficient to move the diaphragm 68 from its deactivated position (FIG. 9) against the force of the coil spring 114.

The safety device 54 operates as follows to prevent intentional movement of the clamp handle 46 to its disengaged position while the pressure in the interior space 14 of the vessel body 12 remains at an unsafe level. Referring specifically to FIG. 10, when the fluid pressure inside the vessel body 12 reaches a dangerous level, i.e., about 3 psi or greater, the pressurized fluid that enters the diaphragm chamber 66 will exert sufficient pressure, in the direction indicated by arrows G, to move the diaphragm 68 to its activated position, against the force exerted by the coil spring 114. In its activated position, the first side 70 of the diaphragm 68 is urged against and conforms to the inner surface of the lower body flange 58. Furthermore, when the diaphragm 68 moves to its activated position, it will overcome the countervailing force of the coil spring 114 and urge the latch pin 102 into its extended position, which will cause the small diameter portion 104 of the latch pin 102 to extend out from the upper opening 92 of the bore hole 88 of the latch pin guide tube 86 and through the latch pin hole 130 of the second leg 128 of the latch plate 120. Once the small diameter portion 104 of the latch pin 102 is received through the latch pin hole 130 of the second leg 128, the second leg 128 cannot be withdrawn from the lower chamber 82 of the upper body 80 of the safety device 54, which, in turn, prevents the latch plate 120 from being moved away from the safety device 54 and the clamp handle 46 from being moved away from the vessel body 12 to its disengaged position (see dotted lines in FIG. 2). The coil spring 114 will be able to overcome the force of the pressurized fluid when the fluid pressure drops to about 2 psi or less, and will then urge the latch pin 102 back into its retracted position (see FIG. 9). As the latch pin 102 moves into its retracted position, the large diameter portion 106 of the latch pin 102 will deflect the diaphragm 68 back into its deactivated position.

Thus, when the fluid pressure inside the vessel body 12 is high enough (i.e., 3 psi or greater) to move the diaphragm 68 to its activated position (FIG. 10), the clamp handle 46 is locked in its engaged position (shown in solid lines in FIGS. 2 and 3), thereby preventing disengagement of the clamp 44 and opening of the vessel cover 18. Furthermore, because the latch pin 102 operates independently of the latch lever 132, when the latch pin 102 extends to latch the second leg 128 of the latch plate 120 as described above, the clamp handle 46 is locked into its enagaged position regardless of whether the latch lever 132 is manually deflected to release its grip on the latch plate 120. Thus, even intentional disengagement of the clamp 44 and opening of the vessel cover 18 is prevented when dangerously high fluid pressures exist inside the liquid filtration apparatus 10. Lastly, both intentional and unintentional movement of the clamp handle 46 to its disengaged position can be prevented by use of a conventional pad lock inserted through the lock-out hole 168 of the latch lever 132. Such use of a conventional lock and the lock-out hole 168 will prevent withdrawal of the tapered portion 144 of the latch lever 132 from the rectangular hole 124 of the first leg 122 of the latch plate 120, regardless of the fluid pressure inside the liquid filtration apparatus 10, and will also prevent movement of the latch plate 120 and the clamp handle 46 away from the safety device 54, regardless of whether the latch pin 102 is extended.

It will be understood that the embodiment described herein is merely exemplary and that a person skilled in the art may make many variations and modifications without departing from the spirit and scope of the present invention. For instance, as already stated, the safety device 54 of the present invention may be used with different types of fluid handling apparatus besides the liquid filtration apparatus described above, including liquid straining apparatus and air or gas filtration apparatus as well as fluid handling apparatus designed for system operating pressures other than 300 psi. In addition, where it is determined that a fluid pressure other than 3 psi is indicative of dangerous system operating pressures inside the fluid handling apparatus, which will depend upon the particular fluid handling apparatus and fluid system therein, the safety device 54 can be designed such that it will activate at different fluid pressures. The safety device 54 can be altered to activate at a different fluid pressure by utilizing a diaphragm 68 made of another flexible, resilient material requiring a different amount of force to be moved to its activated and deactivated positions. Alternatively, another coil spring 114 can be used that has a different spring force that is appropriate for the particular operating conditions. Further, both a different diaphragm 68 and a different coil spring 114 can be used in the safety device 54 to alter the force necessary to extend the latch pin 102 and thereby latch the strike plate 120 to the safety device 54 and lock the clamp handle 46 in its activated position. All such variations and modifications as are described above, including those discussed within the detailed description of the preferred embodiment, are intended to be included within the scope of the present invention.

What is claimed is:

1. A pressure vessel, comprising a cover movable between an open position and a closed position;

clamping means for releasably clamping said cover in its said closed position, said clamping means including a handle adapted to permit the manual operation of said clamping means, said handle being movable between a first position, in which said cover is releasably retained in its said closed position by said clamping means, and a second position, in which said cover is free to be moved to its said open position;

locking means for releasably locking said handle in its said first position upon actuation of said locking means, said locking means including a pin sized and shaped so as to be receivable in an opening provided in said handle, said pin being movable between an extended position, in which it engages said opening, and a retracted position, in which it disengages said opening; and actuating means, which is responsive to an increase in pressure within the pressure vessel, for actuating said locking means when the pressure within the vessel has reached a predetermined level, said actuating means including a flexible diaphragm which is movable between an activated position, in which it causes said pin to move to its said extended position, and a deactivated position, in which said pin is permitted to move to its said retracted position.

2. A pressure vessel according to claim 1, further comprising urging means for urging said pin toward its said retracted position, whereby said pin is moved to its said retracted position when said diaphragm is in its said deactivated position.

3. A pressure vessel according to claim 2, wherein said urging means causes said pin to move from its said extended position toward its said retracted position when the pressure within the vessel is below a predetermined level.

4. A pressure vessel according to claim 2, wherein said urging means includes a spring.

5. A pressure vessel according to claim 4, wherein said actuating means further includes a pair of flanges which form a chamber therebetween, said diaphragm being flexibly and securely positioned between said pair of flanges and within said chamber.

6. A pressure vessel according to claim 5, wherein said chamber is in communication with the vessel such that said diaphragm is moved from its said deactivated position to its said activated position when the pressure within the vessel reaches a predetermined level.

7. A pressure vessel according to claim 6, further comprising guiding means for guiding the movement of said pin between its said extended and retracted positions.

8. A pressure vessel according to claim 7, wherein said guiding means includes a guide tube having a throughbore, said pin being mounted within said throughbore for reciprocating movement therein, said guide tube having an end connected to one of said pair of flanges such that said pin in engageable with said diaphragm.

9. A pressure vessel according to claim 8, further comprising aligning means for aligning said opening of said receiving means with said pin.

10. A pressure vessel according to claim 9, wherein said aligning means includes an upper housing having an open chamber, said upper housing being connected to an opposite end of said guide tube such that said open chamber communicates with said throughbore, said open chamber being sized and shaped so as to receive said receiving means of said handle therein.

11. A pressure vessel according to claim 10, wherein said pin extends into said open chamber and is received within said opening of said receiving means when said pin is in its extended position.

12. A pressure vessel according to claim 11, wherein said pin includes an annular shoulder; and wherein said guiding means further includes a ledge within said throughbore proximate to said opposite end of said guide tube, said spring having one end abutting against said shoulder of said pin and an opposite end abutting against said ledge.

* * * * *